Feb. 8, 1966     C. A. KUBILOS     3,234,396
SPEED CONTROL CIRCUITS AND SERVO-SYSTEMS EMPLOYING THE SAME
Filed Nov. 24, 1961     3 Sheets-Sheet 1
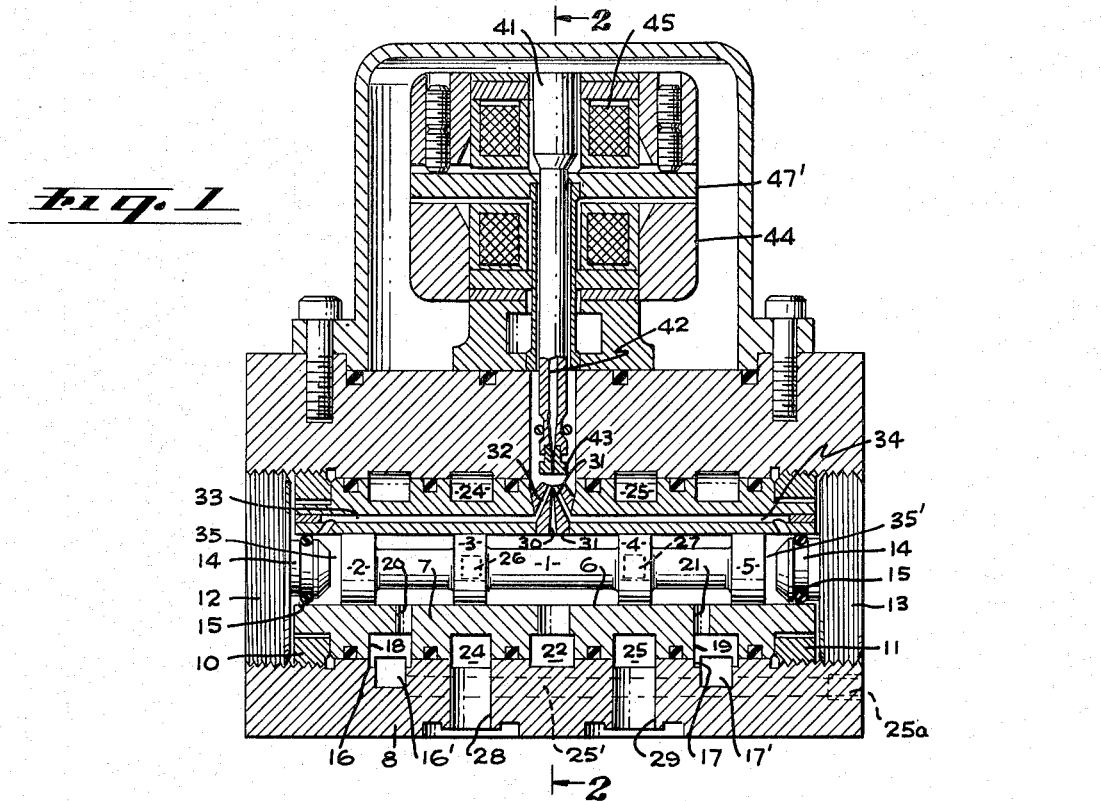
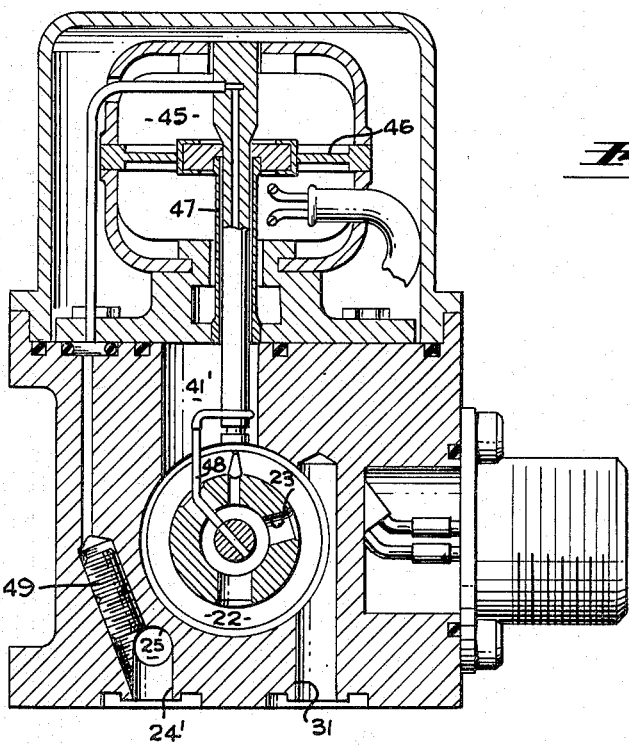
CHARLES A. KUBILOS
INVENTOR.
BY
ATTORNEYS

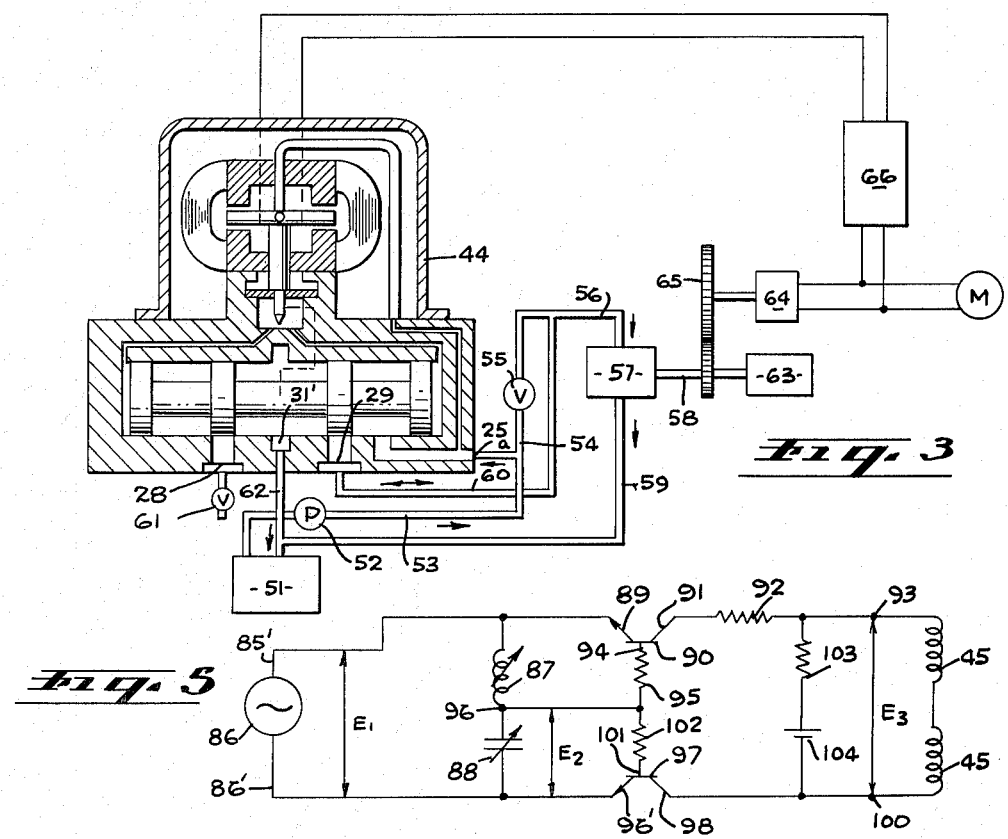

Feb. 8, 1966  C. A. KUBILOS  3,234,396
SPEED CONTROL CIRCUITS AND SERVO-SYSTEMS EMPLOYING THE SAME
Filed Nov. 24, 1961  3 Sheets-Sheet 3

CHARLES A. KUBILOS
INVENTOR.

BY *Philip Subkow*

ATTORNEYS

United States Patent Office 3,234,396
Patented Feb. 8, 1966

3,234,396
SPEED CONTROL CIRCUITS AND SERVO-SYSTEMS EMPLOYING THE SAME
Charles A. Kubilos, Los Angeles, Calif., assignor to American Brake Shoe Company, New York, N.Y., a corporation of Delaware
Filed Nov. 24, 1961, Ser. No. 154,479
17 Claims. (Cl. 290—40)

This invention relates to a servo-system for the control of the rate of rotation of a motor employing an electrical control circuit in which a current or voltage parameter applied at an input point appears at an output point at an intensity responsive to the frequency in the input to the circuit, and to such electrical circuits. It is more particularly applied to an electrical circuit wherein the deviation from a reference frequency appears as a potential at the output of the circuit, which potential is responsive to the deviation. In the preferred embodiment, the aforesaid deviation and the said potential appear as an error signal in a closed loop servo system, which provides feedback means to reduce an ideally cancel the error signal.

In the preferred embodiment, a control of the rate of rotation of a motor which drives an alternator is provided. The alternating current output of the A.C. generator is placed in series with a resonant circuit including an inductance in series with a capacitance, referred to as a series "LC" circuit. The impedance of the LC circuit depends on the difference between the resonant frequency of the series LC circuit, herein also referred to as the reference frequency, and the output frequency of the generator. This frequency difference, i.e., the difference between the frequency of the generated signal and the reference resonant frequency of the LC circuit, is herein referred to as a frequency error. The resultant current or potential in the output circuit will vary with this frequency difference. It is hereinafter referred to as a frequency error signal. The resultant current is gated through a series-connected transistor, connected in a common base configuration. Thus, where a current of the proper polarity and potential, depending on whether the transistors are NPN or PNP, arrives at the required intensity, the collector-emitter impedance is reduced to a low value, and the transistor becomes conductive. At lower values of potential at the base, or if the base is of opposite polarity, the emitter-collector impedance becomes high and the transistor substantially non-conductive. The resultant gated current is integrated in an integration means. Means are provided, employing this integration means, to provide feedback to the alternator to control its speed and thus the frequency of the alternator signal output, to reduce the frequency error signal and thus establish an A.C. output at a frequency substantially the resonant frequency of the LC circuit.

By making the signal at the integration circuit a D.C. signal which is of one polarity with respect to a reference potential, where the input frequency is greater than the reference frequency, and of opposite polarity when the alternator frequency is above the reference frequency, the frequency error signal may be made to control a D.C. motor such as a torque motor. Such a motor may then control a servo-valve to valve fluid to a fluid motor to hold the speed of the motor substantially constant at a "set speed." Variations of the set speed, either an increase or decrease, are cancelled out by the electromechanical servo-system which thus controls the speed of the fluid motor to hold it at substantially "set speed."

The reference frequency which thus establishes the magnitude of the set speed is the resonant frequency and depends on the value of the inductance L and the capacitance C of the series resonant circuit.

In the preferred embodiment of my invention, I apply the aforesaid system to the control of the speed of a hydraulic motor or other fluid motor, to which an alternator is connected, which alternator produces an alternating current signal whose frequency depends on the rate of motion of the fluid motor. The speed of the motor is controlled by a valved line which conducts fluid to the motor, to cause the rotation of the alternator which is driven by the motor. The speed of the motor is thus controlled by the setting of the valve. The valve setting is controlled by an electromechanical device, such as an electromagnetic motor, in such a way that the valve setting is dependent upon the potential imposed on the electromechanical device. By making the potential to be the frequency error signal, the displacement of the D.C. motor is made responsive to the aforesaid frequency error signal. The valve setting, and therefore the fluid motor speed, can thus be made responsive to the magnitude of the frequency error signal. The valve, motor, alternator, LC circuit and the current integrator form a closed servo loop. If the control circuit, fluid motor and valve are made to be such that the fluid motor speed desired is attained when the frequency error signal is reduced to a minimum, and if the system also results in a valve setting which results in a reduction in speed when the frequency error signal is of one polarity and an increase in speed when of opposite polarity, any variation in speed of the motor from a chosen or set speed is corrected by an automatic adjustment of the valve, to cancel the aforesaid speed variation.

For the above purposes, one may use a servo-valve employing a motor which positions the servo-valve, to control the amount of fluid passed per unit of time to the fluid motor. The change in position in the valve, due to a change in the signal applied to the motor, increases or decreases the valve opening, to increase or decrease the speed of the fluid motor and thus the frequency of the A.C. signal developed by the alternator. The valve position is thus varied, responsive to the signal, to adjust the speed of the motor to the desired speed at which the frequency of the A.C. signal is substantially that of the resonant frequency of the series LC circuit, i.e., the set speed.

There are several types of valves which may be used to function in this manner in the system of my invention. I may employ any valve whose port opening may be made responsive to a signal, as, for example, where the valve member varies the port opening and is itself actuated by a motor means which is responsive to an electrical signal. In my preferred embodiment, I may employ a single or double stage servo-valve. Such valves are illustrated by the Atchley Patents Nos. 2,884,906, 2,884,907 and 2,962,611, and U.S. application Serial No. 755,534, filed August 18, 1958, now Patent No. 3,017,864, as well as the Moog Patent No. 2,625,136. In the above valves, as illustrated, the valve setting is controlling by a torque motor whose displacement is proportional to a D.C. potential to the coils of the torque motor.

The above and other objects of my invention will be further understood by reference to the following description, taken together with the drawings.

FIG. 1 is a section through one form of the servo valve.

FIG. 2 is a section taken on line 2—2 of FIG. 1.

FIG. 3 is a schematic diagram of the servo-system employing the control system of my invention to control the speed of a constant displacement fluid motor.

FIG. 5 is a schematic wiring diagram of my control circuit.

FIGS. 6–10 are plots of circuit parameters illustrating the operation of the control circuit of my invention.

Figure 4:
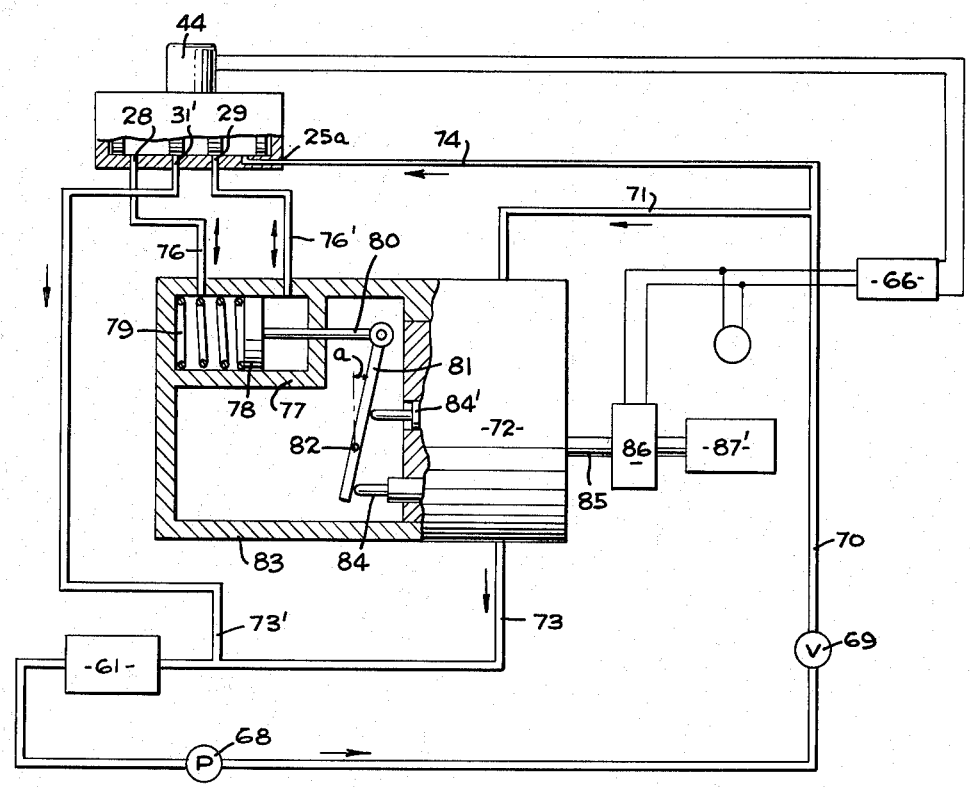
FIG. 4 is a schematic diagram similar to FIG. 3, but applied to a variable displacement motor.

The valve of FIGS. 3 and 4 is described more fully in the aforesaid Atchley patent (U.S. Patent No. 2,884,907), to which reference is herewith made, is employed for purposes of description and not as a limitation of my invention. As suggested above, other types of valves which are positioned by an electromechanical means to control the flow of a fluid may be used, including those suggested above.

The above valve is a two-stage valve in which there is a symmetrical first stage, forming a hydraulic bridge composed of an ejector jet and two receptor jets, and a spool valve having a second stage with chambers in each end of the spool to receive modulated pressures, the pressures in each chamber being called the control pressure. The spool valve valves the fluid to the fluid motor and the return from the motor. A feedback spring is provided between the spool and the ejector jet pipe, to introduce a force feedback loop to make the spool position responsive to the signal force. In such systems the valve port opening is a function of spool position, which is in turn a function of the input signal to the torque motor.

The second stage value includes a spool 1 carrying lands 2, 3, 4 and 5, slidably mounted in a bore 6, positioned in a sleeve 7, which is mounted in a valve case 8, with suitable sealing O-rings. The spool is retained in the valve case by the retaining nuts 10 and 11, and by the plugs 12 and 13, which carry stop plugs 14, and which are sealed in the bore 6 by means of the O-ring 15. The valve case is grooved by circumferential grooves 16 and 17, and the circumferential grooves 16 and 17 are milled out at one side to form the arcuate slots 16' and 17'. The slots are connected by a longitudinal bore 25', sealed by the sealing plug 25a, shown in dotted lines.

The pressure supply is supplied through port 24', shown dotted, which intersects the bore 25'. The sleeve 7 is formed with the circumferential groove 18, which registers with the circumferential groove 16, and the circumferential groove 19, which registers with the circumferential groove 17. A port 20 provides communication between the groove 18 and the interior of the spool between lands 2 and 3, and a port 21 provides communication between the groove 19 and the interior of the spool between lands 4 and 5. The spool is also provided with circumferential groove 24, which intercepts the bore 28, and a circumferential groove 25, which intercepts the bore 29. The square ports 26 and 27 (shown in dotted line in FIG. 1) pass through the sleeve at lands 3 and 4 respectively, and at grooves 24 and 25 respectively, connecting the bore 6 with the grooves 24 and 25 between the lands, as indicated, when the spool is displaced, the degree of displacement of the lands varying the orifice opening at the ports 26 and 27.

The first stage includes an ejector jet and two receptor jets. The receptor jet plug 30 is mounted in a central bore 31 in the sleeve 7 and carries two receptor jet bores 32 and 31, communicating with the longitudinal bores 33 and 34, respectively, which communicate with the chambers 35 and 35', respectively, one at each end of the spool 1. Mounted in a central bore through a slot 41' in the case is a jet pipe 41, having a jet bore 42 and a jet nozzle 43. The input port is connected through a filter 49 and a flexible conduit to the bore 42 of the jet pipe 41. The pipe is positioned with the outlet of the jet nozzle between the entrance to the receptor jet bores 31 and 32. The slot 41' (see FIG. 2) intercepts the grooves 22, which in turn intercepts the port 31', which, as will be seen from FIG. 1, is aligned with the inlet 24'. The jet pipe is mounted on a flexure composed of a tubular flexure 47, connected to an armature 47' of the torque motor 44. The armature is mounted on torsional flexure 46.

The bores 23 (see FIG. 2) are positioned in the sleeve 7, to connect the interior of the sleeve between lands 3 and 4 with the outlet port 31'. A flexible rod 48 connects the spool 1 and the jet pipe 41.

The coils 45 of the torque motor, of which there are two in number, are arranged in push-pull connection, with the four leads being connected so that the magnetic field through the armature generated by the current through the coils modifies the magnetic field of the torque motor, to cause the displacement of the armature 47' when a signal is imposed upon the coils.

When no signal is impressed on the coils, the jet pipe is centered between the receptor jets, and the fluid entering through the port 24' impinges equally on the receptor jets. The pressure in chambers 35 and 35' will be equal, and the spool will take a central position, closing off the bores 26 and 27. No fluid flow goes to or through the ports 28 and 29.

If a signal, i.e., a potential, is applied to the torque motor, the signal, depending on the polarity, will cause a displacement of the armature 47' of the torque motor and therefore of the jet pipe 41. The nozzle 43 will take a position so that it will overlap one of the bores 31 or 32 more than the other of the bores, depending upon the direction of the jet pipe movement. A differential pressure is produced between chambers 35 and 35'. This will cause a displacement of the spool until the flexure in the rod 48 creates a force to balance the force imposed by the torque motor on the jet pipe, at which time the spool will not be displaced any further. Fluid from the supply will come from the input 24' through the bores 26 or 27, depending upon the direction of movement of the spool. Assume the spool displacement is to the right. The port 28 is connected to the supply port 24' via 25', 16, 20 and 26. The return from the fluid motor enters 29 and discharges through 31' via ports 27, 21 and 23.

The magnitude of the spool displacement, and therefore the opening of the ports 26 and 27, depends on the magnitude of the signal which, by displacement of the armature, against the counter force of the feedback rods, moves the spool to a position responsive to the signal at the torque motor. This valves more or less fluid into lines 28 or 29, as will be fully understood from the above and from the description in the Patent No. 2,884,907.

FIGS. 3 and 4 show schematically the application of such a valve to a fluid system of my invention. The valve and torque motor of FIGS. 3 and 4 are shown in schematic form, and ports on FIGS. 3 and 4 are shown as like numbered ports on FIGS. 1 and 2, and the valve and torque motor are understood to be those described above.

FIGS. 3 and 4 illustrate the application of a servo-valve in a servo-system employing the electrical control circuit to be more fully described below. In these systems, the fluid system which powers a fluid motor is controlled by an electromechanical device actuated by an input signal responsive to the speed of the motor, which actuates a valve which valves the fluid to the motor.

In the preferred embodiment of my invention, I prefer to employ a servo-valve.

In the forms as illustrated, employing the valves such as are described in connection with FIGS. 1 and 2, the control pressure difference is modulated in such a way that when the motor speed is at a set speed, the control pressures are balanced; when the control speed is above the set speed, the differential control pressure is in one direction to cause a consequent reduction in speed; and when the speed is below a set speed, the control pressure difference is in the opposite direction to cause a consequent increase in speed. This control pressure modulation is caused by means of a motor responsive to an electrical signal in the form illustrated. The electrical signal to the motor is controlled by the control circuit discussed above and more fully described below.

FIG. 3 shows the application of the above servo-valve in a servo-system to control the speed of a constant displacement fluid motor, wherein the quantity of fluid passing per unit of time from a source of pressure to the fluid motor is controlled by the position of the valve member to a signal from the controlled device, i.e., the fluid motor, whose speed is responsive to the said fluid quantity rate. The quantity rate of the fluid is such that, when the signal is at a minimum or zero, it is sufficient to establish the desired set speed; and when the signal is finite and in one direction, and the motor speeds up above said set speed, the quantity rate is diminished to reduce the speed of the motor; and when the speed falls below said speed, the signal is finite in the opposite direction, so that the quantity rate is increased and the motor speed is up.

In FIG. 4 the system is a position servo-system, in which the position of a servomotor controls the speed of the controlled fluid motor by means of a servo-valve whose valve member position determines the position of the servo-motor. The controlled motor is a variable displacement motor whose speed is responsive to the position of the servo-motor. The position of the servo-motor establishes the set speed of the fluid motor when the signal to the servo-valve is at a minimum. As the speed increases above set speed, the signal is in one direction and is applied to the servo-valve, and the valve member is shifted in one direction. This results in the servo-motor taking a new position to reduce the speed of the fluid motor. As the speed falls below set speed, a signal in the opposite direction is applied to the servo-valve; the valve member shifts, to cause the servo-motor to move in the opposite direction to a new position, to cause an increase in the speed of the fluid motor.

The servo-valve may be any of those referred to above. In FIGS. 3 and 4, the valve of FIGS. 1 and 2 is illustrated. The valve member referred to in such case is the spool.

In FIG. 3 the fluid source, for example a liquid tank 51, is connected through a pump 52 and line 53 to the input port 25a of the valve of FIGS. 1 and 2. It is also connected by a branch line 54 and throttle valve 55 and line 56 to the constant displacement hydraulic motor 57, which acts to rotate a shaft 58. The return line 59 connects the discharge port of the motor to the reservoir. Port 29 of the servo-valve is connected by a line 60 to the line 56 downstream from the valve 55. Port 28 is blocked off by a plug or valve. The return port 31' is connected by a line 62 to the return line 59 downstream from the motor 57.

The shaft 58 is connected to the load 63 and to an alternator which acts as a tachometer to give an alternating current of frequency responsive to the rotation of the shaft 58. It is schematically illustrated at 64 and shown as driven through a gear drive 65.

In FIG. 3, assuming the valve 55 closed and the motor 57 at rest, no signal appears at the torque motor, and the jet pipe and spool are centered. Ports 26 and 27 are closed. The valve 55 is opened. Fluid flows through valve 55, and the motor 57 starts. The speed of the fluid motor depends on the quantity rate of flow of fluid to the motor. Assume that the valve position of 55 is such as to give a quantity flow rate to establish a motor speed which is below set speed. As stated above and as will be more fully described below, a relatively large D.C. signal appears at the coils 45. Assume that this is of a polarity to cause the jet pipe 41 to deflect in a counter-clockwise direction. Assume, for purposes of explanation, that the signal be defined to be of positive polarity. The pressure in chamber 35' becomes higher than in 35, and the spool moves to the left.

The displacement of the jet pipe and spool introduces a flexural force in the spring rod 47, which opposes the electromagnetic force; and the spool 1 comes to a stop when such balance is attained, the movement of the spool uncovering port 27 and connecting it and fluid flows via 53, port 24', port 17, port 21, port 27, annulus 25 into port 29, to add to the flow through 55. Port 28 being blocked, no flow occurs through the return port 31'. The motor speeds up, the frequency error signal decreases, and thus the D.C. signal at coils 45 decreases.

As will be more fully explained below, the magnitude of the signal in the regions remote from the set speed increases with motor speed and then falls to zero at substantially the set speed. The signal at the torque motor thus increases as the motor speeds up, opening port 27, thus accelerating the motor. As the motor approaches set speed, the signal decreases sharply, and becomes a minimum and ideally zero when the set speed is obtained.

The original flexure in the rod 48 moves the jet pipe clockwise, thus reducing the pressure differential in chambers 35 and 35'. As the pressure differential decreases, the flexed rod 48 tends to bring the spool and the jet pipe back to center. Thus, as the valve 55 is gradually opened, the motor speeds up and the flow through 55 increases and that through 60 increases and then the opening of the valve 55 is sufficient to establish the set speed at 58, the spool 1 is centered and no flow is present in 60, port 29 being blocked off at 27 by the land 4. As long as all conditions remain unaltered, this should establish the "set speed."

Should the speed of the motor 57 increase above set speed (for example, because of a reduction in load,) a signal appears at coils 45 of opposite potential to that when the motor was at a speed below set speed.

As is stated above and will be more fully described below, the signal at the torque motor in the region close to but above set speed is a relatively large value of negative polarity, i.e., opposite to that postulated for motor speeds below set speed. As the speed decreases, the signal becomes sharply less negative, until it becomes substantially zero again at set speed. The large negative signal causes the torque motor to deflect the jet pipe in a clockwise direction. Pressure in 35 being greater than in 35', the spool moves to the right. This opens port 27 to annulus 22 and outport port 31, bleeding off a part of the flow through 56 and 60 into port 29, through port 27, annulus 22, ports 23 (see FIG. 3), into output port 31', line 62, back to the reservoir 51. The reduced flow of fluid to 57 will cause a reduction in speed. This reduces the signal and thus the spring flexural forces tend to bring the jet pipe and spool towards center, reducing the opening of 27. This reduces the by-passing of the fluid. Thus, the motor decelerates at a decreasing rate until it reaches set speed, at which time substantially no signal appears at the coil 45, and the spool again centers, and flow through 60 is cut off.

FIG. 4 illustrates the application of the system to a variable displacement motor. In such motors the quantity or pressure of the motor fluid passing to and through the motor is maintained substantially constant; and the motor speed or output torque is varied by varying the displacement of the motor. Such motors are well known, as will be understood by those skilled in the art. See Shaw U.S. Patent 2,713,312; Bonnette et al., U.S. Patent 2,699,123; Parr, et al., U.S. Patent 2,835,228; Born, U.S. Patent 2,619,041. For descriptive purposes, one such motor is illustrated schematically in FIG. 4 as employing the servo-system of my invention, illustrating an application of the above devices wherein the cam plate is positioned by a servo-motor, as illustrated hereinbelow. The design of such hydraulic motors forms no part of this invention.

The servo-valve of FIGS. 1 and 2 is connected so that line 76 connects port 28 to one side of the servo-motor piston 78, reciprocally mounted in cylinder 77. The piston is biased to the right, as shown, by a spring 79. The port 29 is connected by line 76' to the cylinder 77 on the opposite side of the piston 78. Piston 78 is connected to a cam plate 81 by a hinged joint. The cam plate 81 is pivotally mounted on pivot pin 82 in the case. FIG. 4 shows schematically that the angular position of the cam plate (angle $a$), operating on rods 84 and 84', determines the stroke of the motor 72 and the rate of rotation (r.p.m.) of the output shaft 85 driven by the motor.

The power to drive the motor comes from a reservoir 61 containing fluid such as a liquid, the liquid being pumped by pump 68 through the throttle valve 69, line 70 and 71, into the input port of the motor 72, the return from the motor passing through line 73 back to the reservoir 61.

Flow from the line 70 also passes through line 74 into port 24' of the servo-valve. The return port 31' is connected by line 73' to the reservoir 61.

The shaft 85 is connected to an alternator 86, such as is shown at 64 in FIG. 3, and to the load 87'.

The A.C. current output of the alternator is applied to the control electrical circuit 66 to generate a D.C. signal, which is applied to the torque motor 44 in the manner to be described in connection with FIG. 3, and more fully described below.

The position servo-motor piston determines the fluid motor speed, and the piston position is determined by the position of the spool valve which, in turn, is determined by the magnitude and direction of the signal applied to the torque motor.

With valve 69 closed and no signal applied to the torque motor 44, the spool 1 of the valve of FIG. 1 is centered, and the control pressures are balanced. The fluid pressures on both sides of the piston 78 are balanced, and the spring bias of the spring 79 has moved the piston 78 to the right, as shown, and the cam plate is at an extreme angular position with the angle "*a*" at a maximum, as illustrated in FIG. 4. This is the condition for the motor control when the motor is stationary with valve 69 closed.

When the valve 69 is opened, the torque imposed on the motor shaft 85 is at a maximum. The shaft torque is proportional to the angle "*a*." The motor starts to speed up, and the D.C. output from the control circuit 66 appears at the torque motor 44. The frequency of the A.C. output of the alternator 86 increases as the motor speed increases. A signal appears at the torque motor coils. Assume this signal to be of positive polarity, following the above connection. The torque motor armature is displaced counterclockwise, to increase the pressure in 35' above that in 35. The spool 1 moves to the left, and the port 26 is connected to port 28 and to port 24', and port 29 to port 27, and to the discharge port 31'. Since at starting speed the cam plate is at an angle "*a*," to develop a torque in excess of load, the motor tends to speed up. As the motor speeds up, the D.C. signal at the torque motor coils increases in positive value, and the port opening of 27 increases.

As previously described, as the motor speed increases, the signal to the torque motor increases in positive value. This moves the spool further to the left, increasing the port opening at 27 and 26. This increases the pressure differential across the piston 78, moving it to the left against the bias of spring 79, reducing the cam angle "*a*" and thus reducing the speed of the motor. So long as the speed of the motor is above set speed, and the angle "*a*" is greater than that at set speed, the motor torque is greater than the load, and the motor accelerates, but at a reducing rate as it approaches set speed.

As it reaches the region of set speed, the D.C. potential falls sharply to a substantially zero value. The bias on the spool moves the spool 1 to its central position, closing ports 26 and 27.

As the speed of the motor rises above set speed, a D.C. potential of opposite polarity (negative polarity) appears at the coils of torque motor 44. A large negative signal appears at the torque motor, moving the jet pipe 41 in a clockwise direction, thus increasing the pressure in 35' above that in 35, and thus connecting port 24' through port 27 to port 29 and line 76', and connecting line 76 through port 28 with line 76'. The piston 78 is thus moved to the left, as shown, against the spring bias of spring 79, and is thus reducing the cam plate angle "*a*" and reducing the speed of the motor.

Should the speed of the motor fall below the set speed, the D.C. signal of the originally described polarity, i.e., positive polarity, appears to cause the torque motor to move the valve to connect line 76 to the input port 24' and the line 76' to the output port 31'. The piston 78 moves to increase the cam plate angle "*a*" and thus increases the speed of the fluid motor. The fluid motor is thus controlled at the set speed.

A preferred embodiment of my control circuit to accomplish the above functions is illustrated in the schematic circuit diagram of FIG. 5.

The output of the alternator 86 (64 of FIG. 3 or 86 of FIG. 4) is applied at 85 and 86, which form the input terminals of the control circuit 66, as shown in FIG. 5. In series with the output terminals 85' and 86' of the alternator is an LC circuit composed of the inductive impedance 87 in series with the condenser 88, forming a series resonant circuit. The inductance and condenser 88 is shown schematically as variable, not necessarily because variable inductance and condensers need be employed, but to show that the value of L and C of the inductance and condensers may be of different values, so long as the product of LC is at the value to give a resonant frequency which will establish an output potential of the control circuit in the desired direction and magnitude, as will be more fully described below. The input terminal 85' of the control circuit is connected in series with the emitter 89 of the transistor 90, and the collector 91 of the transistor is connected through resistance 92 to the output terminal 93, forming one pole of the output terminals of the control circuit.

The base 94 of the transistor 90 is connected, through a resistance 95, by a conductive connection to a point 96 between the inductance coil 87 and the condenser 88. The other input terminal 86' of the control circuit is connected in series with the emitter 96' of the transistor 97, whose collector 98 is connected to the pole 100 of the output terminal. The base 101 of the transistor 97 is connected through resistor 102 to 96 by a conductive connection.

Across the output terminals 93 and 100 is connected the RC circuit, composed of a resistance 103 and the condenser 104. The terminals 93 and 100 are connected to the coils of the torque motor, as shown in FIGS. 3 and 4.

It will be noted that the transistors 90 and 97 are shown as N-P-N transistors connected as series gates in common base configuration, whereby, whenever the signal at 96 is positive, it triggers the transistors 97 and 90 to make them conductive, and places them in substantially non-conductive condition whenever the signal at 96 is below a minimum level for saturation of the transistors or is at a negative polarity. One of the transistors operates on one half cycle in a normal manner, while the other of the transistors on the same half cycle acts as an inverted transistor, reversing their roles on the other half cycle.

The resonant frequency (in cycles per second $f_o$) of the series resonant circuit, composed of inductance 87 in henrys (L) and condenser 88 in farads (C), is given by the equation:

$$f_o = \frac{1}{2\pi}(LC)^{-\frac{1}{2}}$$

This frequency may thus be termed the reference frequency.

In such circuit the impedance of the LC circuit is at a minimum when the applied frequency at 85' and 86' is at the above resonant frequency ($f_o$). However, the minimum value of this impedance is such that it does not put a significant additional load on the alternator. The impedance of the LC circuit is significantly higher, for example, 5 to 10 times, the load impedance, for example, the impedance of the torque motor coils.

When the alternator output frequency "*f*" is at the resonant frequency $f_o$, the voltage at 96 is $-90°$ out of phase to the applied voltage at 85' and 86', i.e., the phase angle is negative 90°. When $f$ is less than $f_o$, the phase angle is negative and less than 90°; and for output frequencies greater than $f_o$, the phase angle of the current is negative and greater than 90°.

The net current appearing at the integration RC circuit 103 and 104 thus depends on the above phase angle.

Figure 9:
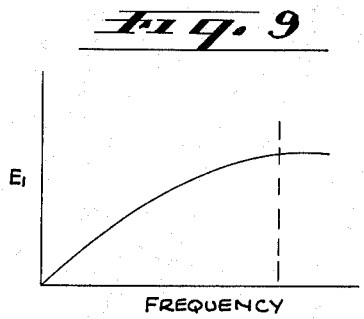
Figure 10:
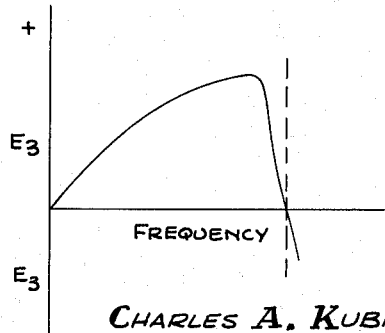

FIGS. 6, 7 and 8 illustrate the effect of phase angle on the net current, and FIGS. 9 and 10 illustrate the relation between the motor speed and input and output voltage of the control circuit. The above figures are not intended to be quantitative, but merely illustrative. FIG. 6 illustrates a condition when the input frequency $f$ at 85' and 86' is at the resonant frequency $f_o$. The phase angle of the switching current at 96 is —90° with respect to the input at 85' and 86', and the net integrated current at 93 and 100 through the torque motor coils has an average value which is substantially zero. The voltage $E_3$ at the output terminals 93 and 100 is at substantially zero value.

FIG. 7 illustrates a condition where the frequency ($f$) is below the resonant frequency ($f_o$) at such value that the phase angle of the switching current is —45° with respect to the input. The net integrated current is positive. The magnitude of the integrated, positive current is the greater as the value of the phase angle becomes less negative than —90°.

FIG. 8 illustrates a condition where the frequency ($f$) is more than the resonant frequency ($f_o$) at such value that the above phase angle is —135°. The net integrated current is negative, i. e., the potential appearing at 100 and 93 is of the opposite polarity to that appearing where the frequency ($f$) was below $f_o$.

FIG. 9 illustrates such a condition, where the output potential $E_1$ (see FIG. 6) is plotted against $f$, and the dotted vertical indicates the frequency at the set speed, i.e., at the resonant frequency of the series resonant circuit LC. As will be seen from FIGS. 7, 8 and 9, the transistor action produces an effective demodulation of the A.C. current. The transistors act to block the current for portions of the cycle depending upon the above phase relations. This action thus introduces a D.C. component whose average value and polarity depend on the sign and magnitude of the frequency error, i.e., the direction and difference between the generated A.C. frequency and the reference frequency, which is the resonant frequency of the series resonant circuit. The resonant circuit thus converts the frequency error to a phase error, and the transistors convert the phase error to a D.C. component which, acting with the averaging circuit, that is, the filter 103 and 104, or the coils 45, if the proper Q value, establishes the D.C. potential $E_3$.

The output voltage of the alternator is a function of its speed of rotation and for purposes of this explanation may be taken as proportional to speed at low values of the speed. The output voltage of the alternator, while substantially proportional to the speed at low outputs and speeds, falls off as the speed increases. At speeds within the practical range of interest, in the region of the set speed (dotted vertical) the voltage output varies but a relatively small percentage with speed, i. e., the curve of FIG. 8 is relatively flat.

FIG. 10 illustrates the variation of the output voltage $E_3$ with input frequency of the alternator. As will be seen, at frequencies below resonant frequency, $E_3$ rises to a maximum as frequency approaches the resonant frequency, and then falls sharply, reaching zero at the resonant frequency, shown at the dotted vertical, and then becomes rapidly more negative as the output frequency rises above the resonant frequency. It will be understood that the cross-over from positive to negative may occur at finite values of $E_3$, positive or negative, depending on environmental conditions or circuit parameters used. The position of the cross-over may be taken as zero for purposes of this description.

It will be noted that, although the input voltage changes but little either side of set speed (see FIG. 9), the output voltage varies sharply at the resonant frequency, going from a large positive value to a large negative value over a small frequency range. The system is highly sensitive to motor speed and is not materially affected by amplitude variation of the input signal in the region of the set speed.

In designing the control circuit, the resistance of the base resistors are taken so as to establish an equal bias at the bases 94 and 101, so that, when the bias is positive, both the transistors are saturated and conductive. The resistances are made sufficiently large with respect to the impedance in the circuit to establish the necessary triggering potential. The resistances 92 and 103 are relatively lower in resistance. The resistances and the capacitance of the condenser 104 are made such as to establish an RC integrating circuit. It also acts in combination with the rest of the circuit, including the torque motor coils, to effectively make the torque motor coils an essentially resistive load.

The following illustrates an example of suitable parameters for a control circuit for use with an Atchley valve, as described above. Inductance 87 is 1 henry, capacitor 88 is 0.0025 microfarad, resistors 95 and 102 are 300K, resistor 103 is 2000 ohms, resistor 103 is 200 ohms, and condenser 104 is 100 microfarads, for torque motor coils, two in number and series connected, each having an inductance of 1 henry and a D.C. resistance of 1000 ohms. The above example is to be taken as an illustration and not as a limitation of my invention.

Since the torque motor is a D.C. device, but with an inductive load, it is desirable to use the RC circuit composed of 92, 103 and 104, to avoid the interference of the inductive load with the operation of the device. However, if the Q of the torque motor coils, i.e. the ratio of the inductive reactance to resistance, is favorable, it may itself act as an integrating filter. In such case, the filter composed of 103 and 104 need not be used. This may be desirable, since it avoids reduction in the value of $E_3$ due to an impedance of the RC circuit.

Instead of using NPN transistors, I may employ PNP transistors with appropriate connections.

Employing the above circuit, as will appear from the foregoing, when the motor is at set speed and the frequency appearing at 85' and 86' is at the resonance frequency, the potential of the $E_3$ is substantially zero. No signal appears at the torque motor, and the servo-valve is centered. If, for example, the load decreases and the motor speeds up to raise the output frequency above resonance frequency, the voltage rises sharply to a high negative value. The servo-valve spool is displaced so as to cause a decrease in speed of the motor, whereupon, as the motor reaches the set speed, the output frequency is again at resonance frequency. The signal to the torque motor is again reduced in value to substantially zero, and the spool is again centered. If the speed of the motor falls below set speed, the output voltage $E_3$ rises sharply to a high value of opposite polarity, and the torque motor moves the spool from center in the opposite direction, to result in the increase in speed up to set speed.

The output voltage $E_3$ is thus a signal at the input to the torque motor, which is displaced in a direction to introduce a negative feedback effect to the generator drive, to cancel out the frequency error at $E_1$, resulting from the variation in speed from the motor from set speed determined by the frequency value of the control circuit including the series LC circuit.

While I have described a particular application of my control circuit, whose output signal is sensitive to the direction as well as magnitude of the frequency error signal, to control the position of a servo-valve member, which in turn determines the valve openings and the fluid motor speed, it is to be understood that the frequency error signal may be used to control in any other system where the controlled variable results in an A.C. output of an alternator whose frequency is a function of the magnitude and sign of the controlled variable.

While I have described particular embodiments of my invention for the purpose of illustration, it should be understood that various modifications and adaptations thereof may be made, within the spirit of the invention, as set forth in the appended claims.

I claim:

1. A servo-system including an A.C. generator, a power system for driving said generator, the frequency of the generated current being responsive to a variable in a power system driving said generator, a control circuit having input connections connected to the output of said generator and output connections, said control circuit including a resonant circuit, said circuit connected in series with the input connections and in series with the output connections of said control circuit, means to control said power system, means coupled to said resonant circuit and controlled by said resonant circuit to demodulate said generated current to establish a D.C. component in said generated current, said resonant circuit coupled to said input and to said demodulating means and responsive to the phase difference between the generated current and the current in said resonant circuit, said phase difference being responsive to the sign and magnitude of the difference between the frequency of said generated current and the resonant frequency of said resonant circuit, and means to integrate the said demodulated current to establish an average D.C. potential which, in polarity and magnitude, is responsive to said magnitude and sign of said frequency difference, and means responsive to said potential to control a variable of said power system and the frequency of said generated current, to maintain the same at substantially the resonant frequency of said resonant circuit.

2. In the system of claim 1, said means to demodulate said generated current including a pair of transistors, each connected in common base configuration, one of said transistors on each half cycle of the generated current connected as an inverted transistor, the collector and emitter circuit of one of said transistors coupled in series with one of the input terminals and one of the output terminals of said control circuit, said resonant circuit being a series resonant circuit comprising an inductance conductively connected in series to a capacitance, the inductance of said series resonant circuit coupled to said emitter-collector circuit of said one transistor, and the emitter-collector circuit of the other of said transistors coupled in series wih the other input terminal and the other output terminal and coupled to the capacitor of said series resonant circuit, and the base of said transistors connected by a conductive connection to the series resonant circuit at a point between the inductance and capacitance.

3. In the system of claim 2, said means responsive to said D.C. potential including an electromagnetic motor having coils connected to the output of said circuit.

4. In the system of claim 2, said means to integrate said demodulated current including a resistance in series with a capacitance forming an RC circuit in series with said output terminals of said control circuit and with the coils of said electromagnetic motor.

5. In the system of claim 1, in which said power source is a fluid motor and said variable of said power system is the speed of said motor, said means to control the speed of said motor comprising a servo-valve having valve ports and a valve member controlling the opening of said valve ports, a fluid power source connected to said valve ports, means responsive to the position of said valve member to control the speed of said fluid motor and means to control the said valve position including an electromagnetic motor having coils, said coils being coupled in series with the output of said control system whereby the D.C. potential, at said coils, actuates said electromagnetic motor connected to said valve member, to adjust the position of said valve member to control said speed and maintain said generated frequency at substantially said reference frequency.

6. In the system of claim 5, said means to demodulate said generated current including a pair of transistors, each connected in common base configuration, one of said transistors on each half cycle of the generated current connected as an inverted transistor, the collector and emitter circuit of one of said transistors coupled in series with one of the input terminals and one of the output terminals of said control circuit, said resonant circuit being a series resonant circuit comprising an inductance connected in series to a capacitance, the inductance of said series resonant circuit coupled to said emitter-collector circuit of said one transistor, and the emitter-collector circuit of the other of said transistors coupled in series with the other input terminal and the other output terminal, and coupled to the capacitor of said series resonant circuit and the base of said transistors, connected by a conductive connection to the series resonant circuit at a point between the inductance and capacitance.

7. In the system of claim 6, said means responsive to said D.C. signal including an electromagnetic motor having coils connected to the output of said circuit.

8. In the system of claim 7, said control circuit also including a resistance in series with a capacitance, forming an RC circuit in series with the output terminals of said control circuit and with the coils of said electromagnetic motor.

9. In the system of claim 5, said fluid motor being a constant displacement motor, a fluid power connection to said motor, a throttling valve in said connection, a fluid discharge connection from said motor, a by-pass connection around said valve, including said servo-valve, said servo-valve including a first port in said servo-valve connected to the high pressure side of said throttling valve and a second port in said servo-valve connected to the low pressure side of said throttling valve and a third port connected to the discharge connection from said motor, whereby, when the D.C. signal is of one polarity, said valve member is positioned to open said first and second ports and thus open the by-pass around said throttling valve and close the said third port connected to said discharge from said motor, and when the D.C. signal is of the other polarity, the third port is connected to the port connected to said low pressure side of said throttling valve and closing the second port connected to the high pressure side of said throttling valve.

10. In the system of claim 9, said control circuit including a pair of transistors, each connected in common base configuration, the collector and emitter circuit of one of said transistors coupled in series with one of the input terminals and one of the output terminals of said control circuit, a series resonant circuit comprising an inductance conductively connected in series to a capacitance, the inductance of said series resonant circuit coupled to said emitter-collector circuit of said transistor, and the emitter-collector circuit of the other of said transistors coupled in series with the other input terminal and the other output terminal, and coupled to the capacitor of said series resonant circuit, and the base of said transistors connected by a 'conductive connection to the series resonant circuit at a point between the inductance and capacitance.

11. In the system of claim 10, said means responsive to said D.C. potential including an electromagnetic motor having coils connected to the output of said circuit.

12. In the system of claim 9, said means to integrate said demodulated current also including a resistance in series with a capacitance forming an R.C. circuit in series with said output terminals of said control circuit and with the coils of said electromagnetic motor.

13. In the system of claim 5, said fluid motor being a variable displacement motor, said means to vary the speed of said motor including means to vary the displacement of said fluid motor, said last named means including a servo-valve and a servo-motor, said servo-motor having a spring biased servo-motor piston, a first servo-motor port in said servo-valve connected to one side of said servo-motor and a second servo-motor port in said servo-valve connected to the other side of said servo piston, a third port in said servo-valve connected to a fluid discharge line, and a fourth port connected to a source of fluid pressure, said valve member being moved to valve fluid into said servo-motor on one side of said servo-motor piston from said source of fluid pressure through said fourth port and one of said servo-motor ports, when said D.C. signal is in one direction, and to discharge fluid from the other side of said piston through the other of said servo-motor ports to said fourth port on application of a D.C. signal in the other direction, said electromagnetic motor moving said valve member to connect said first mentioned servo-motor port to said fourth port and to said discharge, and to connect said second mentioned servo-motor port to said third port and to said pressure source.

14. In the system of claim 13, said means to integrate said demodulated current including a pair of transistors, each connected in common base configuration, the collector and emitter circuit of one of said transistors coupled in series with one of the input terminals and one of the output terminals of said control circuit, a series resonant circuit comprising an inductance connected in series to a capacitance, the inductance of said series resonant circuit coupled to said emitter-collector circuit of said one transistor, and the emitter-collector circuit of the other of said transistors coupled in series with the other input terminal and the other output terminal and coupled to the capacitor of said series resonant circuit, and the base of said transistors connected by a conductive connection to the series resonant circuit at a point between the inductance and capacitance.

15. In the system of claim 14, said means responsive to said D.C. signal including an electromagnetic motor having coils connected to the output of said circuit.

16. In the system of claim 15, said means to integrate said demodulated current also including a resistance in series with a capacitance forming an RC circuit in series with said output terminals of said control circuit and with the coils of said electromagnetic motor.

17. A control circuit for an alternator to control the rate of rotation of the alternator to maintain the frequency of the A.C. current developed by the alternator substantially constant, said circuit including a pair of input connections and a pair of output connections, a series resonant circuit in series with said input connections, said series resonant circuit including an inductance in series with a capacitance, a pair of transistors connected in common base configuration, the emitter-collector circuit of one of said transistors coupled in series with one of said input connections and one of said output connections, the base electrodes of each of said transistors coupled by a conductive connection to said series resonant circuit at a point between said capacitance and said inductance a like one of the other of the electrodes of said transistors coupled to one of said input connections and the other electrode of each transistor coupled to one of said output connections.

References Cited by the Examiner
UNITED STATES PATENTS

| | | | |
|---|---|---|---|
| 1,694,637 | 12/1928 | Bethenod | 322—32 |
| 1,872,243 | 8/1932 | Churcher | 290—40 |
| 2,151,127 | 3/1939 | Logan et al. | 290—40 |
| 2,637,015 | 4/1953 | Franklin | 290—40 X |
| 2,682,633 | 6/1954 | Woerdemann | 290—40 X |
| 2,866,150 | 12/1958 | Lewis | 290—40 X |
| 2,916,635 | 12/1959 | Nicita | 290—2 |

ORIS L. RADER, *Primary Examiner.*

MILTON O. HIRSHFIELD, JOHN F. COUCH,
*Examiners.*